(12) United States Patent
Jun

(10) Patent No.: US 7,649,705 B2
(45) Date of Patent: Jan. 19, 2010

(54) DATA READ RETRY WITH READ TIMING ADJUSTMENT FOR ECCENTRITY OF DISC IN DATA STORAGE DEVICE

(75) Inventor: Jin-Wan Jun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 903 days.

(21) Appl. No.: 11/076,234

(22) Filed: Mar. 8, 2005

(65) Prior Publication Data

US 2005/0201236 A1      Sep. 15, 2005

(30) Foreign Application Priority Data

Mar. 12, 2004   (KR)   ...................... 10-2004-0016870

(51) Int. Cl.
 *G11B 5/09* (2006.01)
(52) U.S. Cl. ....................................................... 360/51
(58) Field of Classification Search .................... 360/51
 See application file for complete search history.

(56) References Cited

U.S. PATENT DOCUMENTS

| 5,053,892 | A | * | 10/1991 | Supino et al. .................. 360/62 |
| 6,009,063 | A | * | 12/1999 | Nguyen et al. ............ 369/13.34 |
| 6,014,349 | A |   | 1/2000 | Iwasaki et al. ................. 369/32 |
| 6,285,635 | B1 |   | 9/2001 | Watanabe et al. ......... 369/44.27 |
| 2002/0149868 | A1 | * | 10/2002 | Nakasato ...................... 360/51 |
| 2005/0052770 | A1 | * | 3/2005 | Osafune ...................... 360/51 |

OTHER PUBLICATIONS

Japanese Patent Application No. 11116427 to Shigeo, having Publication date of Nov. 7, 2000 (English Abstract page).
U.S. Appl. No. 2005/0052770 to Osafune with title "Method and Apparatus for Recovering Read Errors in a Disk Drive".
Japanese Patent Application No. 1991-305017 to Kotoda Kaoru et al., having Publication date of Jan. 8, 1993 (English Abstract page).
Japanese Patent Application No. 2001-202374 to Sato Naoki, having Publication date of Jan. 17, 2003 (English Abstract page).
Japanese Patent No. JP10334621 to Mamoru, having Publication date of Dec. 18, 1998 (w/ English Abstract page).
Korean Patent Application No. 1020010063107 to Han et al., having Publication date of Apr. 18, 2003 (w/ English Abstract page).
Japanese Patent Application No. 2000-063806 to Atsushi et al., having Publication date of Sep. 14, 2001 (w/ English Abstract page).

\* cited by examiner

*Primary Examiner*—Daniell L Negrón
(74) *Attorney, Agent, or Firm*—Monica H. Choi

(57) ABSTRACT

For performing a retry in a data storage device, a spin jitter value corresponding to a desired sector of a disc is determined. A read timing is adjusted according to the spin jitter value of the desired sector. A retry of a data read is performed for the desired sector with the adjusted read timing. Thus, the present invention accounts for eccentricity of the disc as indicated by the spin jitter value during retry of the data read operation.

18 Claims, 7 Drawing Sheets

FIG. 6

| JITTER VALUE | -5~-4 | -4~-3 | -3~-2 | -2~-1 | -1~0 | 0~1 | 1~2 | 2~3 | 3~4 | 4~5 |
|---|---|---|---|---|---|---|---|---|---|---|
| CHANNEL SET | A | B | C | D | N/A | N/A | E | F | G | H |

DATA READ RETRY WITH READ TIMING ADJUSTMENT FOR ECCENTRITY OF DISC IN DATA STORAGE DEVICE

This application claims priority to Korean Patent Application No. 2004-0016870, filed on Mar. 12, 2004, in the Korean Intellectual Property Office, the disclosure of which is incorporated herein in its entirety by reference.

BACKGROUND OF THE INVENTION

1. Field of the Invention

The present invention relates generally to data storage devices such as HDDs (hard disc drives), and more particularly to retrying of a data read within a data storage device with adjustment of read timing depending on eccentricity of a disc.

2. Description of the Related Art

A hard disc drive (HDD) is a common data storage device within a computer system. The HDD reads/writes data from/to a disc using a magnetic head. For higher-capacity, higher-density, and smaller-size of the HDD, recording density is increased on the disc in both a rotational direction of the disc (i.e., BPI—bits per inch) and a radial direction of the disc (i.e., TPI—tracks per inch). With such higher density, a mechanism for more accurately controlling the magnetic head is needed.

In addition, with such higher recording density and decreased size of the HDD, characteristics of the HDD mechanisms and circuits change, resulting in error during a data read operation. When such an error occurs, a retry process is performed. Typically upon detection of an error during a data read operation, parameters associated with an off-track read or a data read operation are changed, and the data read operation is repeated with such changed parameters.

If the error recurs, the parameters are changed again, and the data read operation is again repeated with the further changed parameters. Such change of the parameters and data read operation with the changed parameters are repeated up to a predetermined maximum number of times.

If the HDD is subjected to external impact, disc slip occurs. Such disc slip results in disc eccentricity. When a data read operation is performed with such a disc slip, the retry process may be performed too many times because of the disc eccentricity from the disc slip, resulting in failure of the data read operation.

SUMMARY OF THE INVENTION

Accordingly, embodiments of the present invention account for such disc eccentricity during retry of the data read operation.

For performing a retry in a data storage device, a spin jitter value corresponding to a desired sector of a disc is determined. A read timing is adjusted according to the spin jitter value of the desired sector. A retry of a data read is performed for the desired sector with the adjusted read timing.

In an embodiment of the present invention, such steps are repeated until the data read is successful, or until a maximum number of retries have been performed. In another embodiment of the present invention, such steps are performed only if a read parameter to be changed in the retry includes the read timing. In a further embodiment of the present invention, such steps are performed only if the disc is eccentric.

In an example embodiment of the present invention, spin jitter is measured along a track of the desired sector for determining whether the disc is eccentric. For example, a maximum of the measured spin jitter is compared with a threshold value for determining whether the disc is eccentric.

In another embodiment of the present invention, the spin jitter is measured from change of linear velocity along the track of the desired sector. In addition, the linear velocity is determined from timings of servo synchronization signals detected along the track of the desired sector.

In a further embodiment of the present invention, a channel setting value is set to correspond to the spin jitter value of the desired sector. The read timing is adjusted according to the channel setting value.

In this manner, the read timing is adjusted depending on the level of eccentricity of the disc. Thus, error during the read operation is less probable from such eccentricity of the disc. The present invention may be used to particular advantage when the data storage device is a HDD (hard disc drive). However, the present invention may be used with other types of data storage devices for reading data from sectors of a disc.

BRIEF DESCRIPTION OF THE DRAWINGS

The above and other features and advantages of the present invention will become more apparent when described in detailed exemplary embodiments thereof with reference to the attached drawings in which:

FIG. 6 is a table of channel setting values for spin jitter values stored in the HDD of FIG. 1, according to an embodiment of the present invention;

The figures referred to herein are drawn for clarity of illustration and are not necessarily drawn to scale. Elements having the same reference number in FIGS. 1, 2, 3, 4, 5, 6, 7, and 8 refer to elements having similar structure and/or function.

DETAILED DESCRIPTION OF THE INVENTION

Figure 1:
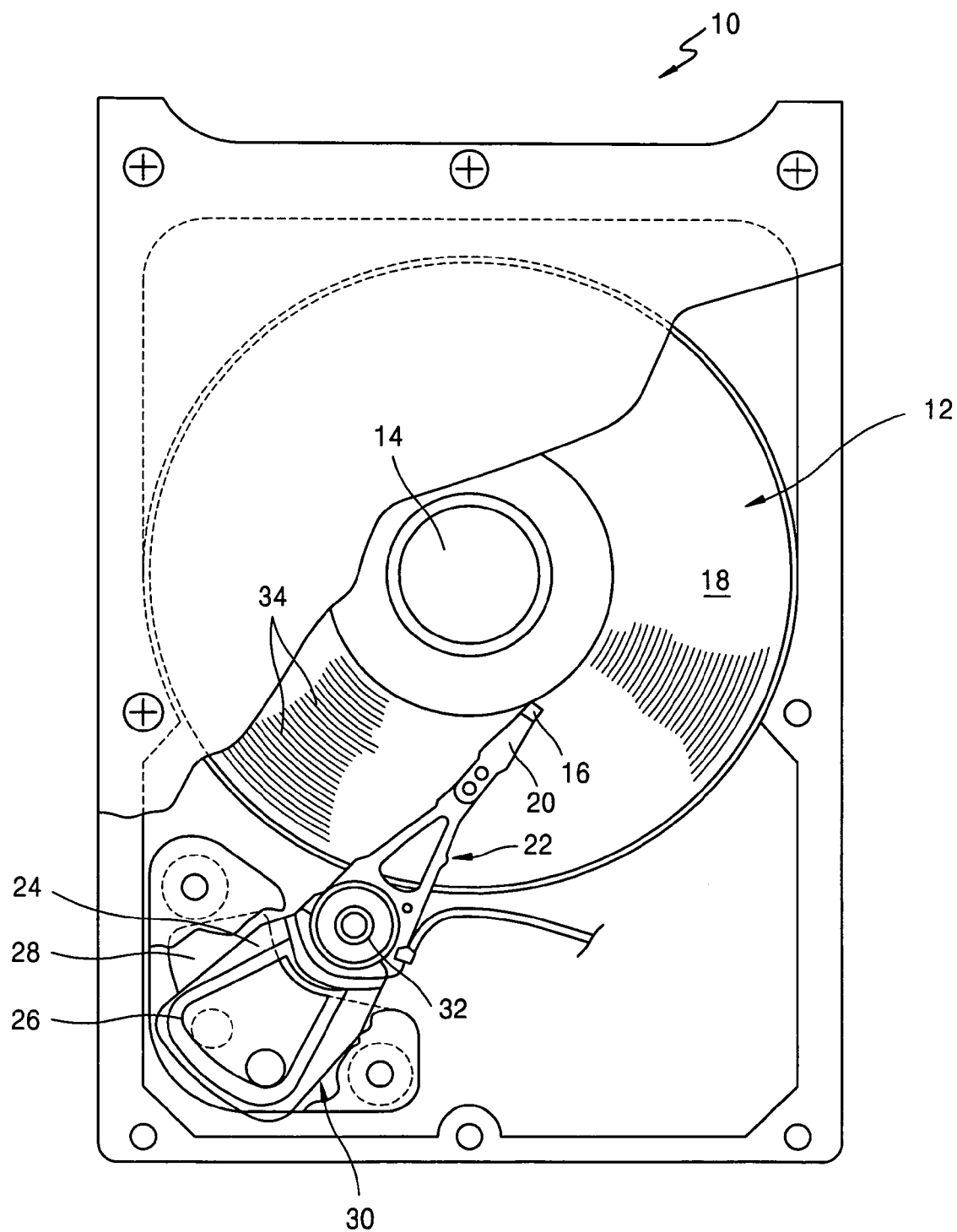
FIG. 1 is a top view of a HDD (hard disc drive) performing a retry control method according to an embodiment the present invention.

FIG. 1 shows a top view of a HDD (hard disc drive) 10 using a retry control method according to an embodiment of the present invention. The retry control method of the present invention is described for a HDD, but such a retry control method may also be practiced within other types of data storage devices reading data from a disc.

The HDD 10 includes a spindle motor 14 and at least one magnetic disc 12 rotated by the spindle motor 14. The disc drive 10 further includes a transducer 16 (often referred to as a head) disposed over a disc surface 18 of the disc 12. The transducer 16 reads/writes information on the disc 12 by sensing/magnetizing a magnetic field of the disc 12. Thus, the transducer 16 may include a read transducer for sensing the magnetic field of the disc 12 and a write transducer for magnetizing the disc 12. In that case, the read transducer is made of a magneto-resistive (MR) material.

The transducer 16 is disposed on a slider 20 and may be integrated into the slider 20. The slider 20 has a typical structure for forming an air bearing between the transducer 16 and the disc surface 18 that is spinning. The slider 20 is connected to a head gimbal assembly 22 that is attached to an actuator arm 24 having a voice coil 26. The voice coil 26 is disposed adjacent a magnetic assembly 28 of a voice coil motor (VCM) 30. When a current flows through the voice coil 26, the VCM 30 generates a torque for rotating the actuator arm 24 around a bearing assembly 32. Rotation of the actuator arm 24 moves the transducer 16 across the disc surface 18.

Figure 7:
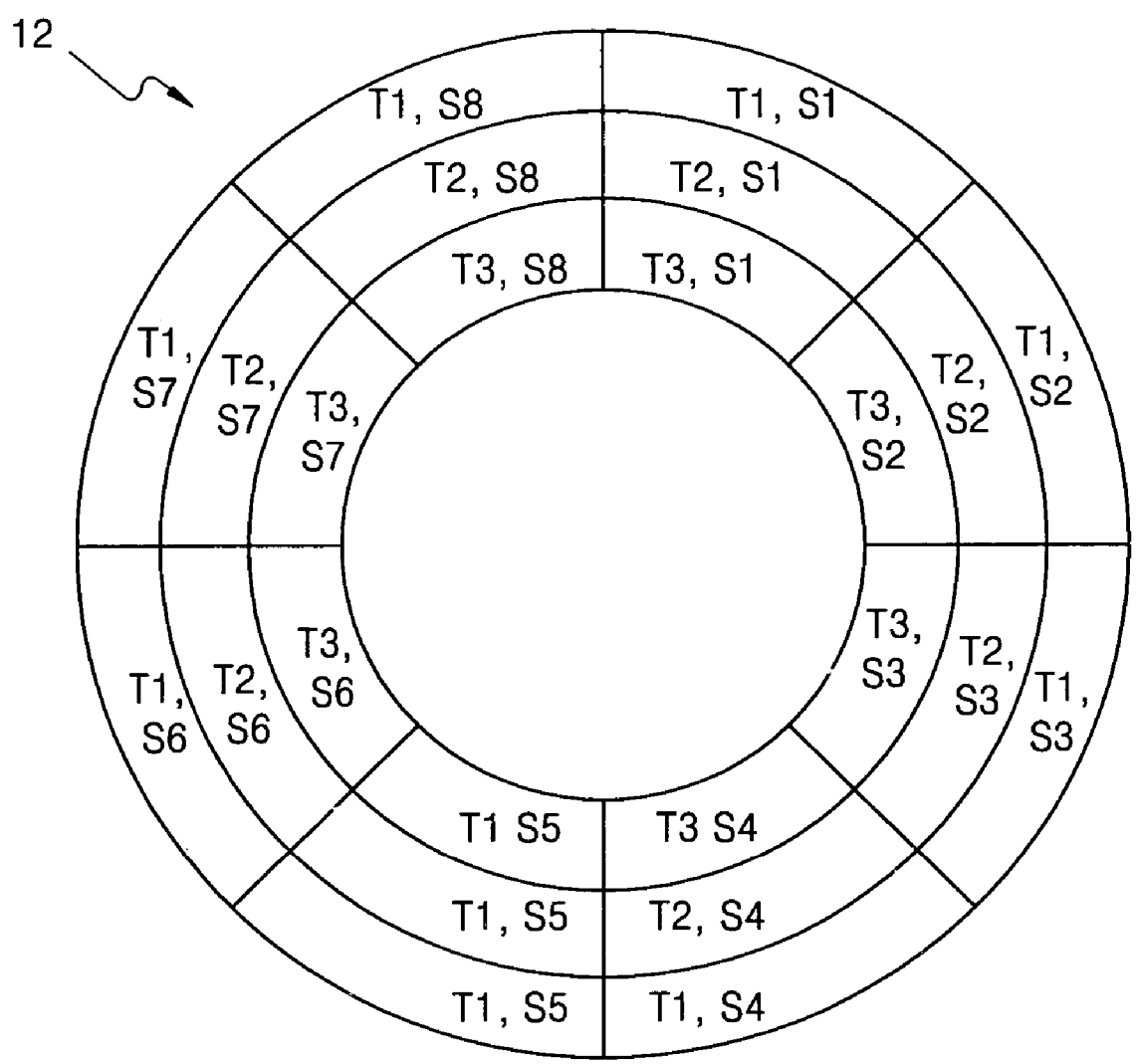
FIG. 7 shows an example disc organized into tracks and sectors.

Typically, information is recorded in circular tracks 34 on the disc 12 with each of the tracks 34 having a plurality of sectors. FIG. 7 shows example tracks and sectors of the disc 12. Each sector is labeled as TX, SY in FIG. 7, with X denoting the track number and Y denoting the sector number. The disc 12 of FIG. 7 has three tracks T1, T2, and T3 each having eight sectors S1, S2, S3, S4, S5, S6, S7, and S8, for simplicity and clarity of illustration and description. However, a disc of a typical HDD has more numerous tracks and sectors.

Each sector has a data field and an identification field with a grey code used for identifying the sector and the track (cylinder) of the sector. The transducer 16 moves across the disc surface 18 in order to read or write data in any of the sectors of the disc surface 18.

Figure 2:
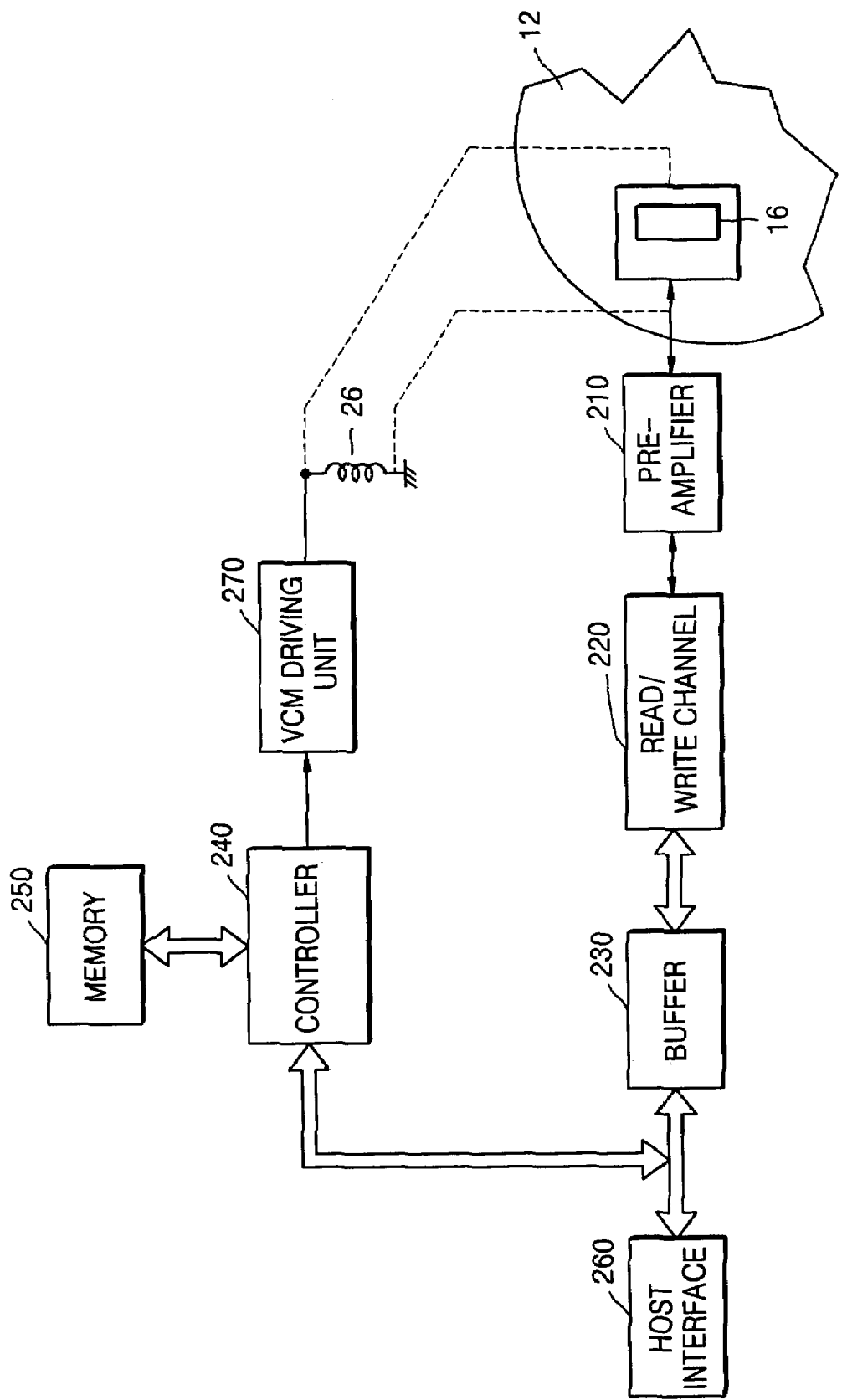
FIG. 2 is a block diagram of components of the HDD of FIG. 1 for performing the retry control method according to an embodiment of the present invention.

FIG. 2 shows a block diagram of electrical components of the HDD 10 of FIG. 1 for performing the retry control method according to the present invention. Referring to FIG. 2, the HDD 10 includes the disc 12, the transducer 16, a pre-amplifier 210, a write/read channel 220, a buffer 230, a controller 240, a memory device 250, a host interface 260, and a VCM (voice coil motor) driving unit 270 coupled to the voice coil 26. The pre-amplifier 210 and the write/read channel 220 are collectively referred to as a write/read circuit.

Various programs (i.e., sequence of instructions) and data used for operation of the HDD 10 are stored in the memory device 250. In particular, execution of the sequence of instructions stored in the memory device 250 by the controller 240 causes the controller 240 to perform the steps of the flowchart of FIG. 3 and the steps of the flowchart of FIG. 8. In addition, a table of channel setting values corresponding to spin jitter values as illustrated in FIG. 6 is stored in the memory device 250.

Figure 3:
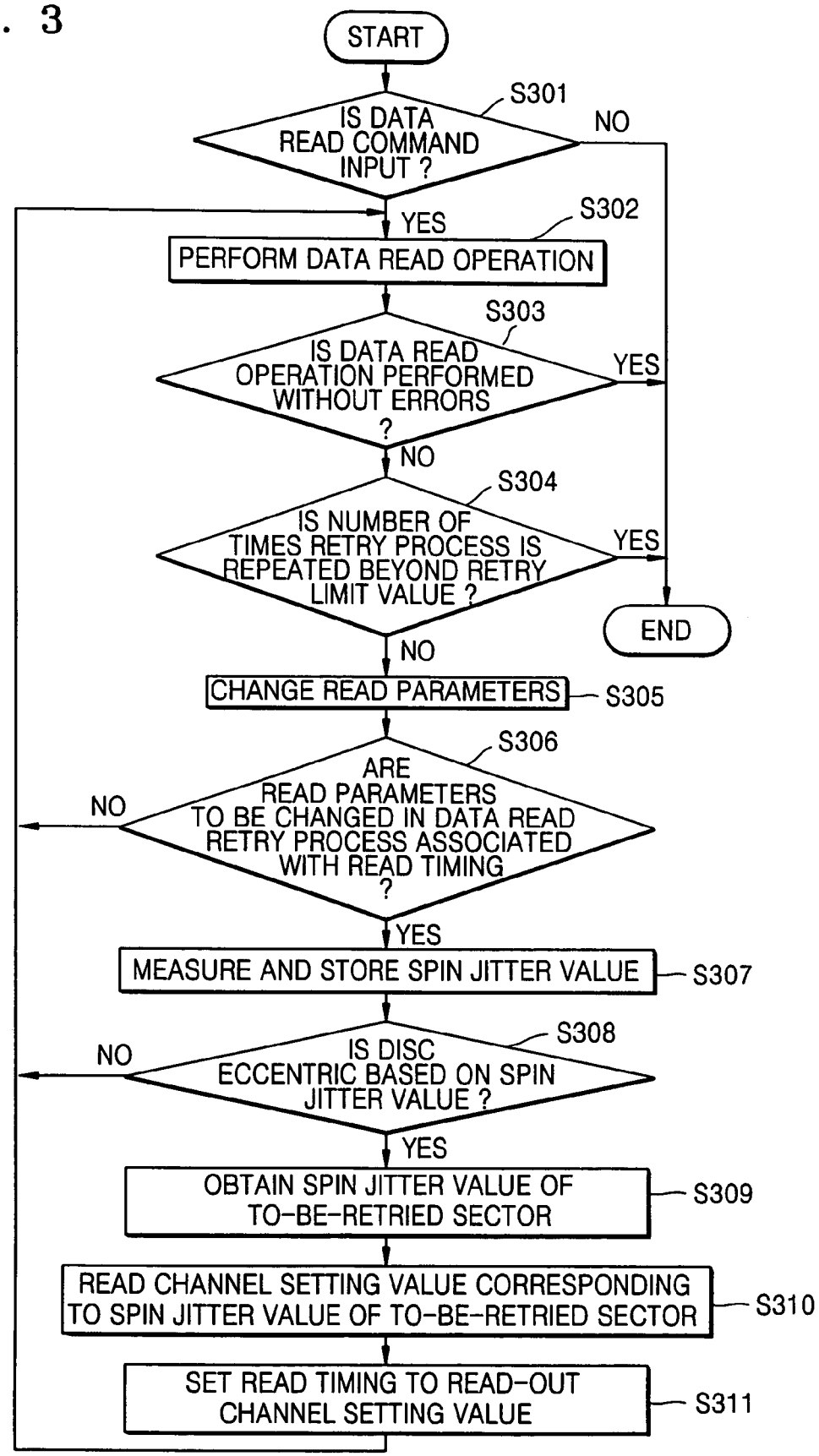
FIG. 3 is a flowchart of the steps of the retry control method according to an embodiment of the present invention.

Operation of the HDD 10 of FIGS. 1 and 2 is now described in reference to the flow-chart of FIG. 3. During a read operation, the transducer 16 senses a magnetic field of the disc 12 to generate an electrical signal. The electrical signal from the transducer 16 that is an analog signal is amplified by the pre-amplifier 210. In addition, such an amplified analog signal is converted into a digital signal by the write/read channel 220 for transfer to a host system (not shown). The digital signal is converted into a data stream that is temporarily stored in the buffer 230. The data stream is then transmitted to the host system through the host interface 260.

During a write operation, data is received from the host system through the host interface 260 and temporarily stored in the buffer 230. The data stored in the buffer 230 is sequentially output and converted into a binary data stream by the read/write channel 220. Such a binary data stream is then written on the disc 12 by the transducer 16 with an amplified write current from the pre-amplifier 210.

The controller 240 generally controls operation of the HDD 10. In embodiments of the present invention, the controller 240 performs the retry control method according to the steps of the flow-charts of FIGS. 3 and 8. In addition, the controller 240 is coupled to the VCM driver 270 supplying a driving current to the voice coil 26. The controller 240 applies a driving control signal to the VCM driver 270 in order to control movement of the transducer 16. In response to the driving control signal applied from the controller 240, the VCM driver 270 supplies the corresponding driving current to the voice coil 26 to move the transducer 16.

Referring to FIGS. 1, 2, and 3, the controller 240 determines whether or not a data read command is input through the host interface 260 from the host unit (step S301 of FIG. 3). If the data read command is not input, the flow-chart of FIG. 3 ends. If the data read command is input, a data read operation is performed on the disc 12 (step S302 of FIG. 3).

Figure 8:
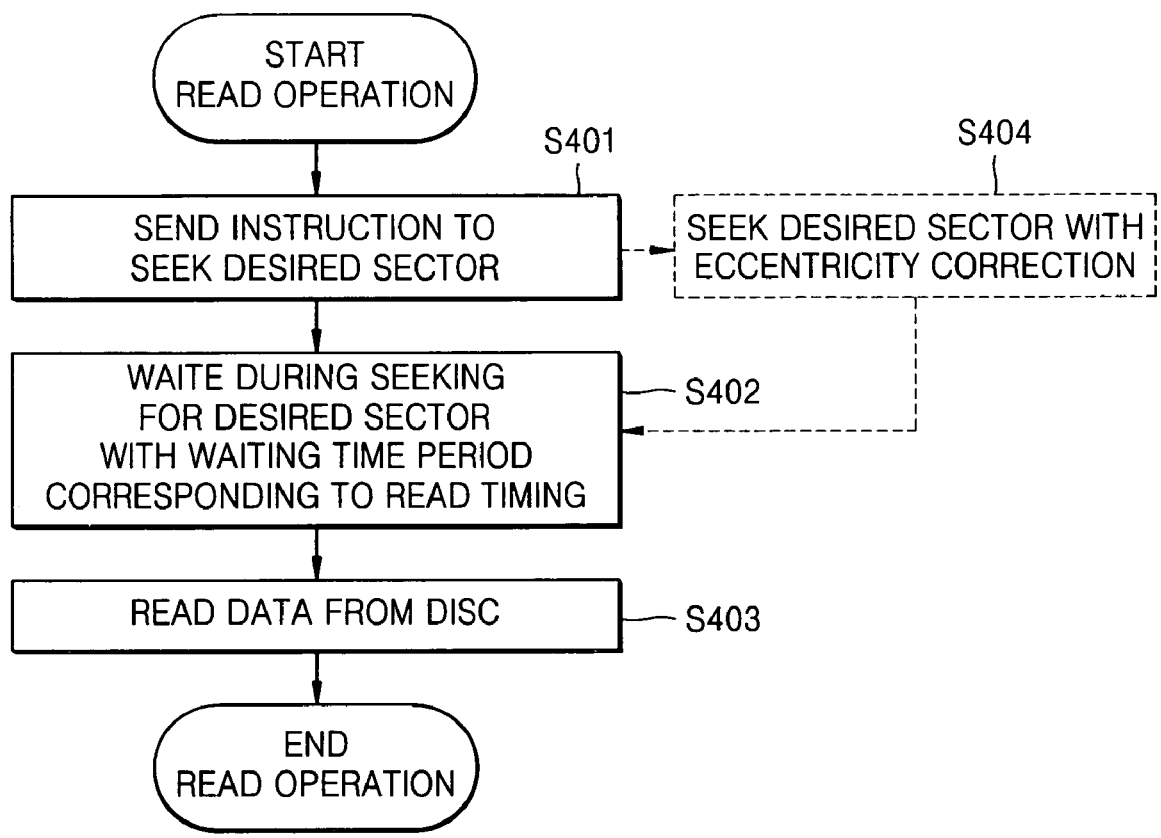
FIG. 8 shows a flowchart of sub-steps for a data read operation step in FIG. 3, according to an embodiment of the present invention.

FIG. 8 shows a flow-chart of sub-steps for the step S302 of FIG. 3. Referring to FIG. 8, upon starting the read operation, the controller 240 sends instruction for seeking a desired sector to be accessed for the read operation (sub-step S401 of FIG. 8). The transducer 16 moves over the disc 12 to seek the desired sector in a seek operation. The controller 240 waits for a waiting time period for completion of such a seek operation (sub-step S402 of FIG. 8). After such a waiting time period, the data is read from the disc (sub-step S403 of FIG. 8) for completion of the read operation of the step S302 of FIG. 3.

Referring back to FIG. 3, the controller 240 thereafter determines whether or not an error has occurred during the data read operation in step S302 (step S303 of FIG. 3). If an error has not occurred, the flow-chart of FIG. 3 ends. If an error has occurred, read parameters are changed incrementally (within retry limits), and the retry process is performed with such changed read parameters.

However, the controller 240 first determines whether the number of times of performing the retry process is beyond a maximum number (step S304 of FIG. 3). If the number of times of performing the retry process is beyond the maximum number, the flow-chart of FIG. 3 ends. If the number of times of performing the retry process is not beyond the maximum number, the read parameters are changed incrementally in accordance with a retry order (step S305 of FIG. 3).

Thereafter, the controller 240 determines whether or not any of the read parameters changed in step S305 is associated with a read timing (step S306 of FIG. 3). Referring to FIG. 8, such read timing for example corresponds to the waiting time period in sub-step S402 of FIG. 8. During such a waiting time period, the seek operation for the desired sector to be accessed for the read operation is performed (sub-step S404 of FIG. 8).

If the read parameters changed in step S305 is not associated with the read timing, the flow-chart of FIG. 3 returns to step S302. If any of the read parameters changed in step S305 is associated with the read timing, spin jitter is measured for one rotation along a track having the desired sector to be accessed, and such measured spin jitter is stored in the memory device 250 (step S307 of FIG. 3).

In one embodiment of the present invention, the measured spin jitter is a change of linear velocity along the track of the desired sector as the disc rotates at a constant angular velocity. The spin jitter is determined by measuring timings of servo synchronization signals detected along the track of the desired sector, and the change of linear velocity is calculated from such measured timings.

Figure 4:
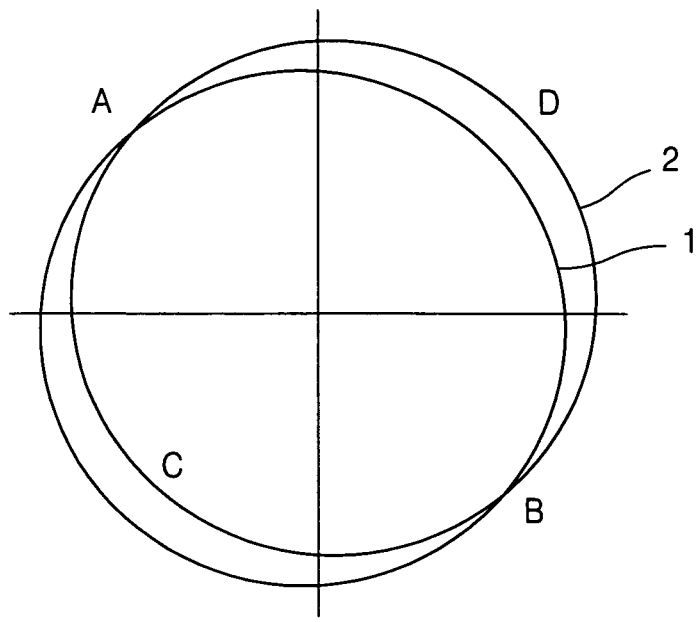
FIG. 4 illustrates example disc eccentricity in the HDD of FIG. 1.

FIG. 4 illustrates example eccentricity of the disc 12. Reference numeral 1 indicates the location of a track of the disc 12 without eccentricity. In that case, the axis of rotation precisely passes through the center of the disc 12. As a result, the linear velocity along the track path 1 is constant such that the spin jitter is substantially 0 along such a track 1.

Figure 5:
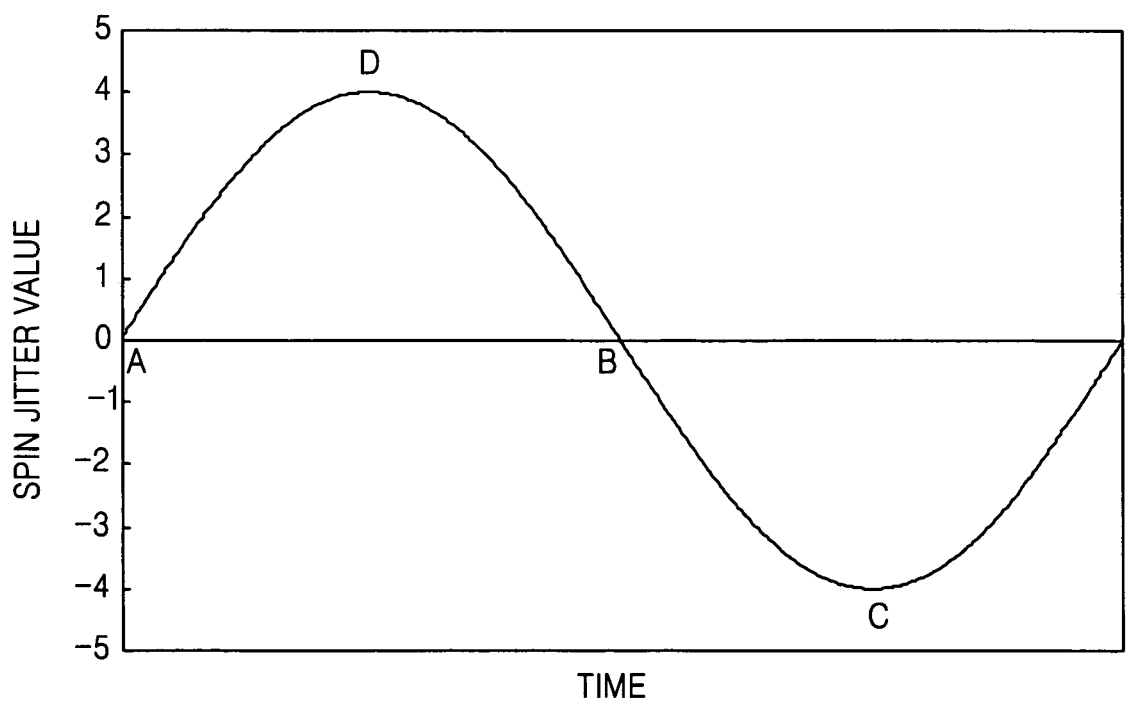
FIG. 5 illustrates spin jitter measured for the eccentric disc of FIG. 4.

On the other hand, reference numeral 2 indicates location of a track of the disc 12 that is eccentric. In that case, the axis of rotation deviates from the center of the disc. Such eccentricity may arise from an external impact on the HDD 10 or from other sources. As a result, the linear velocity along the track 2 changes such that spin jitter is generated having a sinusoidal variation with time, as illustrated in FIG. 5.

Referring back to FIG. 3, the controller 240 determines whether or not the disc is eccentric from the measured spin jitter (step S308 of FIG. 3). In one embodiment of the present invention, the controller 240 compares a maximum of the measured spin jitter to a threshold value. If the maximum of the measured spin jitter is greater than the threshold value, the disc is determined by the controller 240 to be eccentric. For the example of FIG. 5, if the threshold value is 1, the maximum of the spin jitter is 4 at the point D in FIG. 5 such that the disc 12 is determined to be eccentric.

If the disc 12 is determined to be not eccentric, the flow-chart of FIG. 3 returns to step S302. If the disc 12 is determined to be eccentric, a spin jitter value of the desired sector to be accessed for the read operation is determined by the controller 240 (step S309 of FIG. 3). For example, the spin jitter value of such a desired sector is extracted from the spin jitter (as illustrated in FIG. 5) measured for the track having the desired sector.

Thereafter, a channel setting value corresponding to the spin jitter value of the desired sector is read from the table stored in the memory device 250 (step S310 of FIG. 3). Such an example table is illustrated in FIG. 6. Next, the read timing is set according to the channel setting value (step S311 of FIG. 3), and the flow-chart of FIG. 3 returns to step S302 for repeating the data read operation with the adjusted read timing.

Referring to FIG. 8, note that the read timing is adjusted according to the level of eccentricity of the disc 12. Such read timing is adjusted for a longer waiting time period (in sub-step S402 of FIG. 8) during seeking the desired sector (in sub-step S404 of FIG. 8) for a higher level of eccentricity of the disc 12, in one embodiment of the present invention.

Such a seek operation for the desired sector typically includes eccentricity correction which takes a longer period of time for a higher level of eccentricity of the disc 12. Thus, the read timing is adjusted in step S311 of FIG. 3 for a longer waiting time period (in sub-step S402 of FIG. 8) during such a seek operation for a higher level of eccentricity. In this manner, by assuring a sufficient waiting time period for seeking the desired sector to be accessed for the read operation, an error is less likely to occur in the read operation of step S302 of FIG. 3.

In FIG. 3, steps S302, S303, S304, S305, S306, S307, S308, S309, S310, and S311 are repeated until the read operation is successfully performed without an error or until the number of such repetition reaches the maximum number resulting in failure of the read operation. By adjusting the read timing depending on the level of eccentricity of the disc 12, the read operation is more likely to be successfully performed.

While the present invention has been particularly shown and described with reference to exemplary embodiments thereof, it will be understood by those of ordinary skill in the art that various changes in form and details may be made therein without departing from the spirit and scope of the present invention as defined by the following claims.

Thus, the foregoing is by way of example only and is not intended to be limiting. For example, the present invention has been illustrated and described for a hard disc drive, but the present invention may be practiced within any other type of data storage device. In addition, any materials or numbers of elements illustrated and described herein are by way of example only.

Furthermore, the sequence of instructions as described herein may be stored in any type of computer-readable medium or transmitted through a communication medium or network such as an electronic network channel, an optical fiber, air, an electromagnetic network, and an RF network. Examples of the computer-readable medium include an electronic circuit, a semiconductor memory device, a ROM, a flash memory, an erasable ROM (EROM), a floppy diskette, a CD-ROM, an optical disc, a hard disc, an optical fiber medium, an RF network, etc.

The present invention is limited only as defined in the following claims and equivalents thereof.

What is claimed is:

1. A method of performing a retry in a data storage device, comprising:
   (a) determining whether or not a read parameter to be changed in a data read retry process is associated with a read timing;
   (b) if the read parameter is associated with the read timing, measuring a spin jitter value in a track having a desired sector associated with the data read retry process;
   (c) changing the read parameter associated with the read timing according to the measured spin jitter value; and
   (d) performing the data read retry process to the desired sector by using the changed read parameter associated with the read timing.

2. The method of claim 1, further comprising:
   determining whether the disc is eccentric from the measured spin jitter value; and
   performing the steps (a), (b), (c), and (d) only if the disc is eccentric.

3. The method of claim 2, further comprising:
   measuring the spin jitter value from change of linear velocity along the track of the desired sector.

4. The method of claim 3, further comprising:
   determining the linear velocity from timings of servo synchronization signals detected along the track of the desired sector.

5. The method of claim 1, wherein the step (c) includes:
   determining a channel setting value corresponding to the spin jitter value; and
   adjusting the read timing according to the channel setting value.

6. The method of claim 1, further comprising:
   repeating steps (a), (b), (c), and (d) until the data read is successful.

7. The method of claim 1, further comprising:
   repeating steps (a), (b), (c), and (d) until a maximum number of retries have been performed.

8. The method of claim 1, wherein the data storage device is a HDD (hard disc drive).

9. A method of performing a retry in a data storage device, comprising:
   (a) determining a spin jitter value corresponding to a desired sector of a disc;
   (b) adjusting read timing according to the spin jitter value of the desired sector;
   (c) performing a retry of a data read for the desired sector with the adjusted read timing;
   measuring spin jitter along a track of the desired sector;
   determining whether the disc is eccentric from the measured spin jitter; and
   performing the steps (a), (b), and (c) only if the disc is eccentric;

wherein the step of determining whether the disc is eccentric includes:
comparing a maximum of the measured spin jitter with a threshold value.

10. A data storage device comprising:
a controller; and
a memory device having sequence of instructions stored thereon, wherein execution of the sequence of instructions by the controller causes the controller to perform the steps of:
(a) determining whether or not a read parameter to be changed in a data read retry process is associated with a read timing;
(b) if the read parameter is associated with the read timing, measuring a spin jitter value in a track having a desired sector associated with the data read retry process;
(c) changing the read parameter associated with the read timing according to the measured spin jitter value; and
(d) performing the data read retry process to the desired sector by using the changed read parameter associated with the read timing.

11. The data storage device of claim 10, wherein execution of the sequence of instructions by the controller causes the controller to further perform the steps of:
determining whether the disc is eccentric from the measured spin jitter value; and
performing the steps (a), (b), (c), and (d) only if the disc is eccentric.

12. The data storage device of claim 11, wherein execution of the sequence of instructions by the controller causes the controller to further perform the step of:
measuring the spin jitter value from change of linear velocity along the track of the desired sector.

13. The data storage device of claim 12, wherein execution of the sequence of instructions by the controller causes the controller to further perform the step of:
determining the linear velocity from timings of servo synchronization signals detected along the track of the desired sector.

14. The data storage device of claim 11, wherein execution of the sequence of instructions by the controller causes the controller to further perform the step of:
comparing a maximum of the measured spin jitter value with a threshold value for determining whether the disc is eccentric.

15. The data storage device of claim 10, wherein execution of the sequence of instructions by the controller causes the controller to further perform the step of:
determining a channel setting value corresponding to the spin jitter value; and
adjusting the read timing according to the channel setting value.

16. The data storage device of claim 10, wherein execution of the sequence of instructions by the controller causes the controller to further perform the step of:
repeating steps (a), (b), (c), and (d) until the data read is successful.

17. The data storage device of claim 10, wherein execution of the sequence of instructions by the controller causes the controller to further perform the step of:
repeating steps (a), (b), (c), and (d) until a maximum number of retries have been performed.

18. The data storage device of claim 10, wherein the data storage device is a HDD (hard disc drive).

* * * * *